United States Patent [19]

Tenuta

[11] 4,297,381

[45] Oct. 27, 1981

[54] METHOD OF FREEZING TOMATOES

[76] Inventor: Antonio Tenuta, Mongrassano Scalo, Cosenza, Italy

[21] Appl. No.: 54,823

[22] Filed: Jul. 5, 1979

Related U.S. Application Data

[63] Continuation-in-part of Ser. No. 796,398, May 12, 1977, abandoned.

[51] Int. Cl.$^3$ .................... A23L 1/212; A23L 3/36; A23N 7/00
[52] U.S. Cl. .................................... 426/615; 426/482; 426/524
[58] Field of Search ........................ 426/615, 482, 524

[56] References Cited

PUBLICATIONS

Brown, H. E., Freeze-Peeling Improves Quality of Tomatoes, Journal of Food Sci. vol. 35, 1970, pp. 485-488.
Saldana, G., Comparison of Peeling Methods to Improve Firmness in Canned Seasoned Salad Pack Tomatoes, J. Rio Grande vol. Hort. Soc. vol. 25, pp. 72-79, 1970.
Stephens, T., Refrigerated Storage Properties of Liq. Nitrogen Peeled Fresh Tomatoes, J. Rio Grande, vol. Hort. vol 24, 1970, pp. 134-138.
Straniero, D., Novel Freeze-Enzyme Technique Peels Tomatoes at 6 Tons/Hr., Food Eng., Oct. 1956, pp. 58, 59 and 141.

*Primary Examiner*—Jeanette M. Hunter
*Attorney, Agent, or Firm*—McAulay, Fields, Fisher, Goldstein & Nissen

[57] ABSTRACT

A method of solid freezing tomatoes and forming them into solid members free of preservatives and adapted for cutting, shaping and placement into plastic bags. The method includes reducing the ambient temperature of the tomatoes to a freezing temperature of $-30°$ C., cracking the external membrane of the tomatoes by subjecting them to a temperature between $30°$ C. to $35°$ C. for a total temperature gradient of $\Delta T$ equal to between $60°$ C. to $65°$ C. above the freezing temperature, by dipping the tomatoes into backwater supplied from a heat exchanger associated with a cooling device for supplying the low temperature cooling or freezing temperature of $-30°$ C., then peeling the external membrane from the tomatoes and reducing the temperature of the peeled tomatoes again to a freezing temperature.

8 Claims, No Drawings

METHOD OF FREEZING TOMATOES

CROSS-REFERENCE TO RELATED APPLICATION

This application is a continuation-in-part of application Ser. No. 796,398 filed May 12, 1977 now abandoned for An Industrial Proceeding for the Production of Frozen Peeled Tomatoes and By-Products.

BACKGROUND OF THE INVENTION

1. Field of the Invention

The invention is concerned with a method of freezing tomatoes and forming them into solid members free of preservatives and adapted for cutting, shaping and placement into plastics bags.

2. Description of the Prior Art

During the prosecution of the applicant's parent application Ser. No. 796,398, certain prior art was brought to the applicant's attention, and this prior art is considered to be the best prior art now known to the applicant.

Specifically, an article by Diego Staniero entitled "Novel Freeze-Enzyme Technique Peels Tomatoes at 6 Tons/Hr." published in Food Engineering of October 1956 pages 58, 59 and 141 discloses a method of freezing tomatoes in a brine bath. After freezing in the brine bath, the tomatoes are plunged into warm water so as to loosen the skins. The tomatoes are then peeled and canned. The initial temperature of the brine is maintained at 5° F. or −15° C., and the warm water into which the tomatoes are plunged after freezing is maintained at a temperature of 86° F. or 30° C. Specifically, it should be noted that Straniero then cans the warm peeled tomatoes.

Reference is also made to Brown et al., "Freeze Peeling Improves Quality of Tomatoes", published in the Journal of Food Science, Volume 35 (1970) pages 485 to 488, which discloses the use of liquid nitrogen as a refrigerant for freezing the skin of the tomatoes after which they are defrosted at a temperature between 20° to 30° C. The tomatoes are then refrozen and placed into plastic bags for storage with refreezing taking place at −24° C.

There are other well known processes for the peeling of tomatoes, but none provides for an economic and less costly method of peeling tomatoes than the present invention.

SUMMARY OF THE INVENTION

It is an object of the invention to provide for a method of peeling tomatoes which can then be stored and used at a subsequent time.

A further feature of the invention is to provide an industrial process which makes use of the backwater supply from a heat exchanger associated with a cooling device for supplying the freezing temperature to the tomatoes.

The invention is particularly concerned with an industrial process for the production of frozen peeled tomatoes from well matured tomatoes without eliminating the best quality of the vitamin characteristics of the tomatoes. It is desired to provide a tomato product which can be stored and which can be picked at maturity, and then peeled without having the tomato product lose its vitamin characteristics, and without the necessity of having to use any preservatives or additives.

With the present invention, it is possible to have tomato and tomato products readily available as a source of nourishment or alimentation during any period of the year regardless of the tomato season.

The invention is particularly concerned with a method which follows the I.Q.F. (Individual Quick Frozen) rules. In accordance with the teachings of the present invention, the operation or steps of dry-brushing, peeling and grading are designed to take place in the shortest possible time for two essential reasons. One reason is that in order to obtain a finished product which substantially conforms to the I.Q.F. rules provided in accordance with customs in the marketplace. During the processing stages, it is extremely important that the product not require heat, and as much be done as possible to avoid the product from acquiring heat. If the product reacquires or acquires excessive heat, in the case of fruits, such fruits would become flabby and adhere to one another in the refreezing stage and would get enriched with the Howard mold. The second reason is that the longer the working stages are drawn out or protracted, this increases the possibility of the formation of the so called "Howard Molds", and the Howard Mold counts are increased. In this respect, it is well known that in some countries, food is sold with a relatively high index of the mold counts, and these counts can reach to a value of 90 mold counts. On the other hand, in the United States, mold counts only up to 28 to 30 mold counts is tolerated. With the present invention, and the elimination of one defrosting stage and the nearly complete elimination of the refreezing stage because of the quick or rapid working at low temperatures, the end products which are obtained are obtained with an index of Howard Mold counts having a value of only 6, and this value is practically insignificant.

A further feature of the invention is the possibility of reducing the cost of the frozen tomatoes.

The heretofore known methods for peeling tomatoes requires a high amount of thermic energy, and this is quite costly. Because of the necessity of having to bring the tomatoes to a temperature nearest the boiling temperature of water, for example 95° C. in order to strip the tomatoes of their external membrane, the temperature gradient $\Delta T$ between the freezing temperature and the boiling temperature requires a large amount of thermic energy in order to crack the membrane.

Up to the present, it was the opinion of those working in this particular field that in order to detach the film or skin of the tomato from the flesh of the tomato, it was necessary to raise the temperature thereof close to the temperature of the water ebullition or boiling point at a pressure of 1 atmosphere. Clearly, raising the temperature of this figure which is for example 95° C., provides for an extremely high waste of energy and time. As a further consequence, it was necessary to use tomatoes which were not completely ripened, because tomatoes when at their perfectly ripe stage cannot stand the scalding and peeling stages without altering the vitamin features and organolectic properties of the tomatoes.

It is therefore a feature of the invention to provide for a process which radically improves the qualities of the product actually put onto the market while considering at the same time all of the vitamin features and organolectic properties of the tomato, and such processing takes place with an energy savings during the operations, and thereby permits the placement of the product onto the market at very favorable and competitive prices. Additionally, with the present invention, it is possible to use fully ripened tomatoes as well as to store large quantities so as to allow for the processing not only during the harvest season but throughout the entire year.

According to the present invention, the cracking of the membrane is not caused by the temperature of the boiling water at for example 95° C. but by the gap of the initial temperature or normal ambient temperature of the tomatoes and the final temperature, which is the gradient ΔT.

In accordance with the invention, the tomatoes are subjected to an ambient temperature of −30° C. in order to freeze the tomatoes, and then the external membrane of the tomatoes are cracked by subjecting them to a temperature between 30° to 35° C. for a total temperature gradient ΔT between 60° C. to 65° C. above the freezing temperature of −30° C., then the external membrane is peeled from the tomatoes and the temperature of the peeled tomatoes is reduced to the freezing temperature, and the cracking of the external membrane of the tomatoes is carried out by dipping the tomatoes into backwater having the temperature between 30° and 35° C.

Further, in order to obtain the advantages of lowering the cost of the thermic energy required to heat the tomatoes from the freezing temperature, the tomatoes are dipped into the backwater supplied from a heat exchanger associated with the cooling device for supplying the lower temperature cooling of −30° C.

Specifically, with the use of the low temperature gradient of ΔT between 60° to 65° C. between the lowest temperature in the process and the highest temperature, together with the use of the feed water from the heat exchanger used to obtain the low temperature freezing, large savings in cost is achieved in the industrial process.

It should be noted that the initial and final temperature in the invention differ from the ambient and water ebullition temperatures at 1 atmosphere. Specifically, with the use of the particular temperature gradient of ΔT between 60° C. and 65° C., detachment of the film or skin from the flesh of the tomato takes place.

The detachment of the skin from the flesh of the tomato is not due to the value of the particular temperature, and it is not necessary to raise the temperature to that of the water ebullition, as for example 95° C., but is due to the interval or space between the initial temperature and the final temperature which is the temperature ΔT of the gradient as an absolute value.

DESCRIPTION OF THE PREFERRED EMBODIMENTS

The tomatoes after being picked are first frozen to a temperature of −30° C. The ambient temperature of the tomatoes can be reduced to 30° C. in a tunnel rapidly or the temperature can be reduced slowly in a cell to the temperature of −30° C. Both types of cooling takes place at a pressure of 1 atmosphere.

After the tomatoes are frozen whether in the tunnel or in the cell, they are then dipped into water which is maintained at a temperature between 30° C. and 35° C. At this stage, because the temperature gradient ΔT is between 60° C. and 65° C., cracking of the external membrane takes place. In order to achieve the savings in thermic energy for carrying out the process, the tomatoes are dipped into water which is supplied from the heat exchanger used in connection with the freezing of the tomatoes to the −30° C. freezing temperature.

After the external membrane of the tomatoes have been cracked by dipping into the backwater, the tomatoes are then forwarded to a peeling machine in order to peel the external membranes from the tomatoes.

After the membrane of the tomatoes have been peeled and the inner portion or pulp of the tomatoes remains, these tomatoes can then be brought back to the freezing temperature and stored in plastic bags. To further reduce costs and maintain the continuous process, the refreezing temperature is maintained at −30° C. which is equivalent to the initial freezing temperature.

After the peeling operation, the tomatoes are placed into plastic bags which can be cooled to the freezing temperature. Of course, the peeled tomatoes can also be stored in cans and other forms if it is desired not to refreeze the tomatoes.

With the aforementioned process, substantial savings are obtained because the backwater or feed water from the heat exchanger used in order to obtain the initial −30° C. cooling is used to supply the warming temperature between 30° C. and 35° C. in order to crack the external membrane of the tomatoes.

The water emerging from the heat exchanger also is affected by the ambient temperature, and such backwater or feed water is drawn off at a temperature between 30° and 35° C. By virtue of the nature of the manufacturing facilities, sufficient backwater at the aforesaid temperature is obtainable so that there is no increased costs in order to supply the necessary thermic energy to provide for the heated water for the cracking of the tomato membrane. With the savings in thermic energy, the cost of production is substantially lowered.

Moreover, beyond the substantial advantage which is obtained as a result of the economic procedures, there are further features in connection with the invention.

Accordingly, with the use of this invention, it is possible to use completely matured tomatoes without altering their characteristic vitamin or edible qualities during the manufacture. Furthermore, this would not be possible if it is necessary to use a water having a temperature close to the temperature of its boiling point.

It is also possible to avoid the use of additives which may have a deleterious nature both to the product and otherwise.

A further feature is that the frozen product can be maintained in its plastic bags in the frozen state, and the use of metal tins can be avoided, thereby reducing the costs of production, as well as lowering transportation costs.

Moreover, since the tomato industry is normally a seasonal industry, it is further possible to maintain the tomatoes in their initially frozen condition and then subject them to the heated water in order to crack the membranes so that a good portion of the seasonal work can be eliminated.

In addition to bringing the tomatoes to market in frozen plastic bags, it is also possible to provide the tomatoes in minced form by virtue of the freezing. In addition, since the tomatoes in the frozen state are rigid and firm they can be cut into cubic forms or somewhat similar geometric configurations, much like the possibility of cutting potatoes, eggplants and other vegetables. It will be quite evident that much savings can be achieved with the variations achievable with the aforesaid process.

Further, it is possible in the manufacturing of the tomatoes to add mincing and mixtures of various aromatic herbs, such as for example basil, which may be difficult, if not impossible to find in some cold-climate countries, and yet it is indispensable for the flavor and taste of a good tomato gravy. In this respect, the frozen tomatoes which can be cut into cubes can be used to form a tomato gravy.

While the various preferred embodiments of the invention have been described, it will be evident to those skilled in the art that various changes and modifications may be made therein without departing from the scope of the invention.

I claim:

1. A method of freezing tomatoes and forming them into solid members free of preservatives and adapted for cutting, shaping and placement into plastic bags, comprising the steps of:

reducing the ambient temperature of the tomatoes to a freezing temperature of −30° C. for solidification, cracking the external membrane of the solidified tomatoes by subjecting them to a temperature between 30° C. to 35° C. for a total temperature gradient of $\Delta T$ between 60° C. to 65° C. above said freezing temperature, said cracking step includes the step of dipping said tomatoes into heated water having said temperature between 30° C. and 35° C., peeling the external membrance from the solidified tomatoes after cracking the external membrane, and reducing the temperature of the peeled tomatoes again to the freezing temperature of −30° C. for storage of peeled tomatoes free of preservatives.

2. The method as claimed in claim 1, wherein the tomatoes are placed into a plastic container prior to said last step of reducing the temperature the second time of the freezing temperature of −30° C.

3. The method as claimed in claim 1, including placing said peeled tomatoes into a plastic bag prior to the second temperature reducing step, and then cooling said plastic bag with said peeled tomatoes therein to the freezing temperature for the storage of the peeled tomatoes.

4. A method of freezing the entire body of tomatoes in pulp form and forming them into solid members free of preservatives and adapted for refreezing, cutting, shaping and placement into plastic bags, comprising the steps of:

reducing the ambient temperature of the tomatoes to a freezing temperature of −30° C., cracking the external membrane of the tomatoes by subjecting them to a temperature between 30° C. to 35° C. for a total temperature gradient of $\Delta T$ between 60° C. to 65° C. above said freezing temperature, said cracking including the step of dipping of the tomatoes into heated water supplied from a heat exchanger associated with a cooling device which is also used for supplying the low temperature cooling and freezing of −30° C., peeling the external membrane of the tomatoes after cracking the external membrane of the tomatoes to leave the tomatoes in pulp form, placing said peeled tomatoes when in its said pulp form into plastic bags, and reducing the temperature of the peeled tomatoes placed into the plastic bags.

5. The method as claimed in claim 1 or 4, wherein the initial step of reducing the ambient temperature of tomatoes to the freezing temperature of −30° C. includes the the step of rapidly cooling the tomatoes in a tunnel to the −30° C. temperature at an atmospheric pressure of 1 atmosphere.

6. The method as claimed in claim 1 or 4, wherein the initial step of reducing the ambient temperature of the tomatoes to the freezing temperature of −30° C. includes the step of gradually cooling the tomatoes in cells to bring the tomatoes to said temperature of −30° C., and at a pressure of 1 atmosphere.

7. The method as claimed in claim 6, wherein the water supplied from the heat exchanger is heated thereby to said temperature between 30° C. to 35° C. in the heat exchanger while said cooling device supplies the low temperature cooling of −30° C. to said tunnel, and then the tomatoes are dipped into the heated water to crack the external membrance of the tomatoes.

8. The method of freezing tomatoes as claimed in claim 4, wherein said cracking step includes the step of forwarding the tomatoes to a peeling machine to peel the external membrane from the tomatoes.

* * * * *